Patented Dec. 25, 1934

1,985,661

UNITED STATES PATENT OFFICE 1,985,661

PROCESS FOR DRENCHING HIDES

Hans Kögl, Chemnitz, Germany, assignor to the firm H. Th. Böhme Aktiengesellschaft, Chemnitz, Saxony, Germany No Drawing. Application March 7, 1932, Serial No. 597,413. In Germany March 11, 1931

1 Claim. (Cl. 149—3)

According to the present invention it has been found that the so-called pylorus attachments of the fish which in many kinds are present in considerable number and size capable of easy removal are very considerably superior in proteolytic and lipolytic activity to all the remaining portions of the viscera. These pylorus attachments which are of the nature of protrusions of the end portion of the stomach or of the upper section of the intestines, yield ferment preparations which show very much greater proteolytic activity than the preparations prepared from the entire digestive organs of the fish as can, for example, be shown in a simple and clear manner by the casein test. The preparations obtained from the pylorus attachments accordingly have the advantage that the quantity of inactive accompanying substances contained therein which are themselves partially liable to be split up by fermentation, is reduced to a minimum. This is important for their technical and, in particular, their therapeutic application. In the last named application in particular, a high degree of activity of the preparations is important, since the undesired accompanying substances, particularly substances having an undesirable smell and taste, which are contained in large quantities in the preparations obtained from the entire digestive organs of the fish, have a very disturbing effect and require suitable correction.

The production of the preparations is effected when eviscerating, by separating the pylorus attachments from the stomach. After suitable comminution the resulting mash of organs is either employed direct in aqueous suspension in the case of technical fermentation processes, for example, in the drenching of skins and hides or is converted in known manner by drying and extracting with organic solvents into a dry preparation. Glycerine extracts and similar permanent liquid preparations can also be prepared from the comminuted pylorus attachments. Of marketed fish the starting material obtained from, for example, shell fish, is particularly advantageous, since this kind of fish possesses very numerous and large pylorus attachments. The removal of the attachments is, however, quite easily effected even in the case, for example, of herring, since in these fish the pylorus attachments are also comparatively large and well formed.

The following example illustrates how the process of the invention may be carried into effect:—

The pylorus attachments separated from the shell fish or herring are finely comminuted, defatted with acetone or ether and, after separating the organic solvent, dried.

Alternatively the mash of organs can be extracted with dilute alkali, for example with about a ten fold quantity of an N/20 ammonia solution, the extract evaporated in vacuo and the evaporated extract then brought into a dry form with the aid of an atomizing drier.

The dry preparations so obtained can be suitably cut up for technical application and be mixed, for example, with sawdust, inorganic salts or other carriers and diluents as well as with activating additions or preserving agents. After suitable fine grinding in ball mills or the like the product can also be worked up in known manner into pharmaceutical preparations.

The mash of organs can also be pressed or subjected to autolysis for a short time, say 4 hours, and the resulting extract or juice containing the ferments evaporated in vacuo or by a stream of hot air (large surface evaporating). The remaining syrupy mass can be absorbed by a porous material as for instance sawdust or can be mixed with a water binding inorganic salt, such as calcined sodium carbonate or calcined sodium sulfate to form a dry preparation, which can be ground as described above.

I claim:—

A process of treating hides which comprises drenching the hides with a ferment preparation obtained principally from the pylorus attachments of fish.

HANS KÖGL.